(12) United States Patent
Wen et al.

(10) Patent No.: US 11,917,550 B2
(45) Date of Patent: Feb. 27, 2024

(54) COMMUNICATION METHODS AND DEVICES FOR UPLINK POWER CONTROL

(71) Applicants: Alcatel Lucent, Nozay (FR); Nokia Technologies Oy, Espoo (FI)

(72) Inventors: Pingping Wen, Shanghai (CN); Huan Sun, Shanghai (CN); Tao Yang, Shanghai (CN); Xun Li, Shanghai (CN); Yi Zhang, Shanghai (CN)

(73) Assignees: NOKIA TECHNOLOGIES OY, Espoo (FI); ALCATEL LUCENT, Nozay (FR)

( * ) Notice: Subject to any disclaimer, the term of this patent is extended or adjusted under 35 U.S.C. 154(b) by 434 days.

(21) Appl. No.: 16/346,266

(22) PCT Filed: Nov. 3, 2017

(86) PCT No.: PCT/IB2017/001459
§ 371 (c)(1),
(2) Date: Apr. 30, 2019

(87) PCT Pub. No.: WO2018/083536
PCT Pub. Date: May 11, 2018

(65) Prior Publication Data
US 2020/0068494 A1     Feb. 27, 2020

(30) Foreign Application Priority Data
Nov. 3, 2016   (CN) .......................... 201610959077.0

(51) Int. Cl.
*H04W 52/14*     (2009.01)
*H04B 7/06*      (2006.01)
(Continued)

(52) U.S. Cl.
CPC ........ *H04W 52/146* (2013.01); *H04B 7/0617* (2013.01); *H04W 16/28* (2013.01);
(Continued)

(58) Field of Classification Search
CPC ... H04B 7/0404; H04B 7/0617; H04W 16/28; H04W 52/08; H04W 52/146; H04W 52/242; H04W 52/42; H04W 72/046
See application file for complete search history.

(56) References Cited

U.S. PATENT DOCUMENTS 10,098,075 B2 * 10/2018 Wang ..................... H04W 52/06
10,320,093 B2 *  6/2019 Madsen ................... H01Q 3/26
(Continued)

FOREIGN PATENT DOCUMENTS

WO    WO 2006/130327 A2    12/2006

OTHER PUBLICATIONS

Nokia et al., "Power Control for MIMO," 3rd Generation Partnership Project (3GPP), 3GPP TSG-RAN WG1 Meeting #86bis, R1-1610283, XP051150300, 5 pages, Lisbon, Portugal, Oct. 10-14, 2016.
(Continued)

*Primary Examiner* — Alpus Hsu
(74) *Attorney, Agent, or Firm* — Lippes Mathias LLP

(57) ABSTRACT

Embodiments of the present disclosure provide a communication method and device for uplink power control. The method comprises receiving a plurality of sets of power control parameters from a network device, each of the plurality of sets being associated with a corresponding one of a plurality of sets of candidate beam patterns for the terminal device. The method further comprises selecting, based on a beam pattern for the terminal device, one of the plurality of sets of power control parameters for uplink transmit power control, the beam pattern for the terminal device being included in the set of candidate beam pattern that is associated with the selected set of power control parameters.

6 Claims, 6 Drawing Sheets

(51) Int. Cl.
  *H04W 16/28*  (2009.01)
  *H04W 52/24*  (2009.01)
  *H04W 52/42*  (2009.01)
  *H04W 72/04*  (2023.01)
  *H04W 72/044*  (2023.01)

(52) U.S. Cl.
  CPC ......... *H04W 52/242* (2013.01); *H04W 52/42* (2013.01); *H04W 72/046* (2013.01)

(56) References Cited

U.S. PATENT DOCUMENTS

| | | | |
|---|---|---|---|
| 10,524,213 B2* | 12/2019 | Nagaraj | H04W 52/245 |
| 2013/0102345 A1* | 4/2013 | Jung | H04W 72/02 |
| | | | 455/513 |
| 2013/0114562 A1* | 5/2013 | Seo | H04W 52/16 |
| | | | 370/329 |
| 2014/0016573 A1 | 1/2014 | Nuggehalli et al. | |
| 2014/0185481 A1 | 7/2014 | Seol et al. | |
| 2017/0064638 A1* | 3/2017 | Li | H04W 52/243 |
| 2017/0238305 A1* | 8/2017 | Chen | H04L 5/0053 |
| | | | 370/311 |
| 2019/0373559 A1* | 12/2019 | Davydov | H04W 52/58 |
| 2020/0178180 A1* | 6/2020 | Zhang | H04W 52/146 |

OTHER PUBLICATIONS

International Search Report for PCT/IB2017/001459 dated Feb. 8, 2018.

* cited by examiner

COMMUNICATION METHODS AND DEVICES FOR UPLINK POWER CONTROL

FIELD

Embodiments of the present disclosure generally relate to communication technologies, and more specifically, to communication methods and devices for uplink power control.

BACKGROUND 5G wireless and mobile access is expected to use high frequency bands such as mm-wave (MMW) frequencies to provide Gbps data transmission rates. High frequencies of millimeter waves (mmw) signals result in high path loss, and small wavelengths of these signals also enable a large number of antenna elements to be placed in the same physical antenna area, thereby providing high beamforming gains.

Furthermore, in a mobile communication system, uplink power control serves an important purpose. By means of power control, transmit powers for different uplink physical channels and signals are controlled to ensure that they are received with the appropriate power and the link quality is maintained so that the required Quality-of-Service (QoS) is satisfied. For this purpose, the power control has to adapt to the characteristics of the radio propagation channel, including path loss, shadowing and fast fading. Moreover, the power control needs to overcome interference from other users and control interference caused by a user on other cells.

In a mmw system, the severe path loss of the mmw frequency bands can be effectively alleviated because a high beamforming gain is obtained using a large number of antenna elements. Therefore, with respect to beamforming technologies in the mmw system, the power control mechanism in the mmw system needs to be reconsidered and designed so that the power control can be effected better.

SUMMARY

Generally, embodiments of the present disclosure provide communication methods and devices for uplink power control.

In a first aspect, the embodiments of the present disclosure provide a communication method implemented at a network device. The method comprises receiving a plurality of sets of power control parameters from a network device. Each of the plurality of sets being associated with a corresponding one of a plurality of sets of candidate beam patterns for the terminal device. The method further comprises selecting, based on a beam pattern for the terminal device, one of the plurality of sets of power control parameters for uplink transmit power control. The beam pattern for the terminal device is included in the set of candidate beam pattern that is associated with the selected set of power control parameters.

In some embodiments, receiving the plurality of sets of power control parameters from the network device comprises receiving from the network device a signaling that includes the plurality of sets of power control parameters.

In some embodiments, the signaling includes a dedicated signaling used for transferring the plurality of sets of power control parameters.

In some embodiments, the method further comprises receiving from the network device a rule regarding the association between each of the plurality of sets of power control parameters and the corresponding one of the plurality of sets of candidate beam patterns for the terminal device.

In some embodiments, the plurality of sets of candidate beam patterns each include one candidate beam pattern for the terminal device, and each of the plurality of sets of power control parameters is associated with the one candidate beam pattern in the corresponding one of the plurality of sets of candidate beam patterns.

In some embodiments, the plurality of sets of candidate beam patterns each include a plurality of candidate beam patterns for the terminal device, and each of the plurality of sets of power control parameters is associated with the plurality of candidate beam patterns in the corresponding one of the plurality of sets of candidate beam patterns.

In some embodiments, the corresponding set of candidate beam patterns indicates a predetermined range of a beam width.

In some embodiments, the plurality of sets of power control parameters each include a first reference power that includes a second reference power for the network device and an offset for the terminal device, and a compensation factor for path loss between the terminal device and the network device.

In some embodiments, the plurality of sets of power control parameters each include: a first reference power that includes a second reference power for the network device and an offset for the terminal device, a first compensation factor for non-beamformed path loss between the terminal device and the network device, and a second compensation factor for an analog beamforming gain resulting from beamforming for at least one of the terminal device and the network device.

In some embodiments, the method further comprises: determining a first estimation of the non-beamformed path loss based on a reference signal received from the network device; determining a second estimation of beamformed path loss based on a beamformed reference signal received from the network device; and determining the beamforming gain based on a difference between the first estimation and the second estimation.

In some embodiments, the method further comprises performing open-loop control on an uplink transmit power of the terminal device based on an expression as following:

$$P = P0 + \alpha 1 \cdot PL - \alpha 2 \cdot A$$

where P denotes the uplink transmit power of the terminal device, $P_0$ denotes the first reference power, PL denotes the first estimation of the non-beamformed path loss, A denotes the beamforming gain, α1 denotes the first compensation factor, and α2 denotes the second compensation factor.

In a second aspect, the embodiments of the present disclosure provide a communication method implemented at a terminal device. The method comprises receiving at least one set of power control parameters from a network device, the at least one set including a first reference power, a first compensation factor for non-beamformed path loss between the terminal device and the network device, and a second compensation factor for an analog beamforming gain resulting from beamforming for at least one of the terminal device and the network device, the first reference power including a second reference power for the network device and an offset for the terminal device. The method further comprises controlling an uplink transmit power of the terminal device based on the first reference power, the first compensation factor, and the second compensation factor.

In some embodiments, the method further comprises: determining a first estimation of the non-beamformed path loss based on a reference signal received from the network device; determining a second estimation of beamformed path loss based on a beamformed reference signal received from the network device; and determining the beamforming gain based on a difference between the first estimation and the second estimation.

In some embodiments, controlling the uplink transmit power of the terminal device comprises performing open-loop control on the uplink transmit power of the terminal device based on an expression as following:

$$P=P0+\alpha1 \cdot PL-\alpha2 \cdot A$$

where P denotes the uplink transmit power of the terminal device, $P_0$ denotes the first reference power, PL denotes the first estimation of the non-beamformed path loss, A denotes the beamforming gain, α1 denotes the first compensation factor, and α2 denotes the second compensation factor.

In a third aspect, the embodiments of the present disclosure provide a communication method implemented at a network device. The method comprises transmitting a plurality of sets of power control parameters to a terminal device for the terminal device to perform uplink transmit power control, each of the plurality of sets being associated with a corresponding one of a plurality of sets of candidate beam patterns for the terminal device.

In a fourth aspect, the embodiments of the present disclosure provide a communication method implemented at a network device. The method comprises transmitting at least one set of power control parameters to a terminal device for the terminal device to perform uplink transmit power control, the at least one set including a first reference power, a first compensation factor for non-beamformed path loss between the terminal device and the network device, and a second compensation factor for a beamforming gain resulting from beamforming for at least one of the terminal device and the network device, the first reference power including a second reference power for the network device and an offset for the terminal device.

In a fifth aspect, the embodiments of the present disclosure provide a terminal device. The terminal device comprises a transceiver and a controller. The transceiver is configured to receive a plurality of sets of power control parameters from a network device, each of the plurality of sets being associated with a corresponding one of a plurality of sets of candidate beam patterns for the terminal device. The controller is configured to select, based on a beam pattern for the terminal device, one of the plurality of sets of power control parameters for uplink transmit power control, the beam pattern of the terminal device being included in the set of candidate beam patterns that is associated with the selected set of power control parameters.

In a sixth aspect, the embodiments of the present disclosure provide a terminal device. The terminal device comprises a transceiver and a controller. The transceiver is configured to receive at least one set of power control parameters from a network device. The at least one set includes a first reference power, a first compensation factor for non-beamformed path loss between the terminal device and the network device, and a second compensation factor for an analog beamforming gain resulting from beamforming for at least one of the terminal device and the network device. The first reference power includes a second reference power for the network device and an offset for the terminal device. The controller is configured to control an uplink transmit power of the terminal device based on the first reference power, the first compensation factor, and the second compensation factor.

In a seventh aspect, the embodiments of the present disclosure provide a network device. The network device comprises a transceiver. The transceiver is configured to transmit a plurality of sets of power control parameters to a terminal device for the terminal device to perform uplink transmit power control, each of the plurality of sets being associated with a corresponding one of a plurality of sets of candidate beam patterns for the terminal device.

In an eighth aspect, the embodiments of the present disclosure provide a network device. The network device comprises a transceiver. The transceiver is configured to transmit at least one set of power control parameters to a terminal device for the terminal device to perform uplink transmit power control. The at least one set includes a first reference power, a first compensation factor for non-beamformed path loss between the terminal device and the network device, and a second compensation factor for a beamforming gain resulting from beamforming for at least one of the terminal device and the network device. The first reference power includes a second reference power for the network device and an offset for the terminal device.

It should be appreciated contents as described in the SUMMARY portion are not intended to limit key or important features of the embodiments of the present disclosure or used to limit the scope of the present disclosure. Other features of the present disclosure will become easier to understand from the following description.

BRIEF DESCRIPTION OF THE DRAWINGS

The above and other features, advantages and aspects of various embodiments of the present disclosure will become apparent from the following detailed illustration, when taken in conjunction with the accompanying drawings in which the same or similar reference numerals denote the same or similar elements, wherein.

Throughout the drawings, the same or similar reference numerals represent the same or similar element.

DETAILED DESCRIPTION

Embodiments of the present disclosure will be described in more detail with reference to the accompanying drawings, in which some embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure. It should be understood that the accompanying drawings and embodiments of the present disclosure are merely for the illustration purpose, rather than limiting the protection scope of the present disclosure.

As used herein, the term "include" and its variants used here are to be read as open terms that mean "include, but is not limited to". The term "based on" is to be read as "based at least in part on". The term "one embodiment" is to be read as "at least one embodiment"; the term "another embodiment" is to be read as "at least one other embodiment". Definitions of other terms will be presented in description below.

Figure 1:
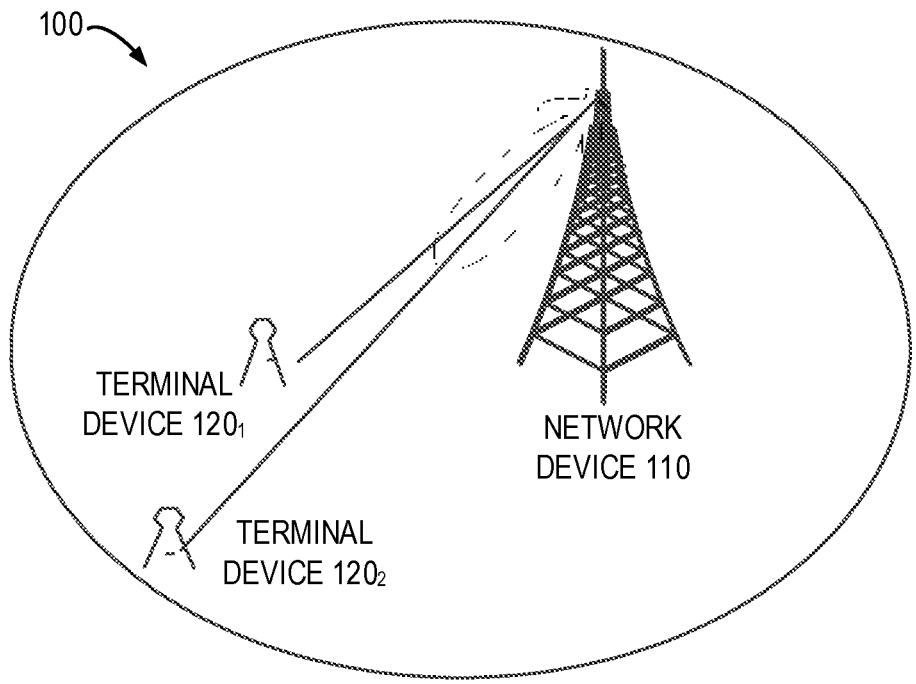
FIG. 1 shows an exemplary communication network in which some embodiments of the present disclosure may be implemented.

FIG. 1 shows an exemplary communication network 100 in which the embodiments of the present disclosure may be implemented. The communication network 100 comprises a network device 110, a terminal device $120_1$ and a terminal device $120_2$. It should be understood that the number of network device and the number of terminal devices as depicted are merely for the illustration purpose without suggesting any limitation. The communication network 100 may include any appropriate number of network devices and terminal devices.

The network device 110 may represent a Node B or NB, an Evolved Node B (eNodeB or eNB), a remote radio unit (RRU), a radio-frequency head (RH), a remote radio head (RRH), a repeater, or a low power node such as a Picocell, a Femto cell and the like.

The terminal device $120_1$ and the terminal device $120_2$ refer to any terminal devices that can perform wireless communication with the network device 110 or between them. As an example, the terminal device may comprise a mobile terminal (MT), a personal digital assistant, a game machine, a wearable device, an on-board communication device, a machine-to-machine communication device, a sensor, etc. The term "terminal device" may be used interchangeably with "user equipment" (UE), mobile station, subscriber station, mobile terminal, user terminal or wireless device.

Communication among the network device 110, the terminal device $120_1$ and the terminal device $120_2$ may be implemented according to any appropriate communication protocol, including without limitation to, the first generation (1G), the second generation (2G), the third generation (3G), the fourth generation (4G), the fifth generation (5G) and other cellular communication protocol, wireless local area network communication protocols such as Institute of Electrical and Electronics Engineers (IEEE) 802.11, and/or any other protocols that are currently known or to be developed later. Furthermore, the communication utilizes any appropriate wireless communication technology, including without limitation to, code division multiple access (CDMA), frequency division multiple access (FDMA), time division multiple access (TDMA), frequency division duplexing (FDD), time division duplexing (TDD), multiple input multiple output (MIMO), orthogonal frequency division multiplexing (OFDM), and/or any other technology that is currently known or to be developed in future.

It should be noted although the embodiments of the present disclosure are described using the mmw system as an example, this is merely exemplary, and the technical solution of the present disclosure may be applicable to other appropriate systems that are known or to be developed in future.

In Long-Term Evolution (LTE) systems, transmit powers for different uplink physical channels and signals are controlled to ensure that they are received with the appropriate power. In the meanwhile, the transmit powers should not be unnecessarily high, because this would cause unnecessary interference to other transmissions in neighboring cells.

The power control scheme in LTE systems employs a combination of open-loop and closed-loop power control. The open-loop power control sets a coarse operating point for the transmission power spectrum density (PSD) based on path loss estimation. The closed-loop power control can fast adjust the power around the open-loop operating point to fine-tune the power setting so as to adapt the channel condition as well as the interference level.

The uplink channels and signals need to perform power control, including physical uplink control channel (PUCCH), physical uplink shared channel (PUSCH) and sounding reference signal (SRS). In the open-loop power control for PUSCH and SRS, path loss is compensated with fractional power control, which is a scheme between "no compensation" and "full compensation" and may be described as following:

$$P=P_0+\alpha \cdot PL \quad (1)$$

where P denotes the transmission power spectrum density of a terminal device, $P_0$ denotes a first reference power which the network device 110 configures for user equipment, PL denotes path loss, and $\alpha$ denotes a path loss compensation factor and ranges between 0 and 1.

Full compensation (with $\alpha=1$) maximizes fairness for cell-edge terminal devices. However, considering a plurality of cells together as one system, the use of partial path-loss compensation can increase the total system capacity in the uplink because inter-cell interference caused to neighboring cells is considered and controlled.

To improve the network capacity and data rate, the network network 110 may operate over high frequency bands, such as mmw frequency bands. In mmw systems, a large number of (tens or hundreds of) antennas may be equipped at the network device 110. Theoretically, a large-scale MIMO system with the full digital beamforming (BF) may achieve the optimal performance. Due to the high cost and complexity of the full digital beamforming hardware, the hybrid analog and digital beamforming is employed, in which only one or a few RF chains are used and each RF chain is connected to a set of antenna elements forming an analog beam. The transmitter selects a transmit beam pattern, which determines the phase shifter weights to steer the beam in a certain direction. Similarly, the receiver selects a receive beam pattern to receive the beam in a certain direction. Therefore, whether and how to consider the beamforming gain in the power control should be one key issue for the 5G mmW system design.

There has been proposed to use in 5G systems the uplink power control scheme similar to that in LTE and consider the beamforming gain. The beamformed path loss is derived based on a beamformed reference signal and is compensated according to the open-loop power control expression as following:

$$P = P_0 + \alpha \cdot PL_{BF} \quad (2)$$

where $PL_{BF}$ denotes the beamformed path loss. Because $PL_{BF} = PL - A$, the expression (2) may be converted to:

$$P = P_0 + \alpha \cdot (PL - A) \quad (3)$$

where PL denotes the non-beamformed path loss (also referred to as "pure path loss" below), and A denotes the analog beamforming gain for the terminal device. "PL−A" denotes the beamformed path loss which can be measured through the beamformed reference signal. However, there will be two issues with this method.

First of all, because beamforming is used at the terminal device side, the beam pattern used at the terminal device will be different. The terminal device may support narrower beams, wider beams and no beamforming. Due to the use of the beamforming technology, the edge user in a cell might cause less interference to neighboring cells. With different beam patterns, the interference to neighboring cells will be different. If the beam transmitted by the terminal device is narrower, small interference will be caused to neighboring cells. If an omni antenna (i.e., no beamforming) is used at the terminal device, large interference will be caused to neighboring cells. Since the fractional power control in LTE systems considers both the received power as well as the interference to other cells, the path-loss compensation factors α can be used to adjust the tradeoff between the received power and interference to other cells. Therefore, it is necessary to study how to set the power control parameters such as α and $P_0$ for different beamforming patterns at the terminal device side.

Besides, for a terminal device in a beam coverage of a network device, the terminal device can have one pure path loss value and one analog beamforming gain (including both the transmitter beamforming gain and the receiver beamforming gain). The pure path loss value can implicitly indicate the position of the terminal device in the cell, and the analog beamforming gain can indicate the position of the terminal device in the network device receiver beam as well as the position of the network device in the terminal device transmitter beam.

Consider an example as shown in FIG. 1. As shown, the terminal device $120_1$ is at the edge of the beam of the network device 110 and thus the beamforming gain of the terminal device $120_1$ is smaller. The terminal device $120_2$ is at the center of the beam of the network device 110 and thus the beamforming gain of the terminal device $120_2$ is larger.

Assume the terminal device $120_1$ and the terminal device $120_2$ have the pure path losses PL1, PL2 and the analog beamforming gains A1, A2, respectively. If PL1−A1=PL2−A2, the transmit power of the terminal device $120_1$ is equal to the transmit power of the terminal device $120_2$ based on the expression (3). However, the interference of the terminal device $120_1$ and the terminal device $120_2$ to the neighboring cell will be different due to their different positions in the cell. As depicted, the terminal device $120_2$ is much closer to the neighboring cell and thus it will generate more interference to the neighboring cell.

In the LTE systems, the path loss may reflect the positions of the terminal device relative to the serving network device and the neighboring network device. Thus, the fractional power control can well control the received power as well as the interference to neighboring cells. In the mmw system that supports the beamforming technologies, if the beamformed path loss is measured, this path loss will not simply indicate the position of the terminal device in the cell because the beamforming gain is included in the path loss measurement. Therefore, it is well worth studying how to consider the beamforming gain in the uplink power control to optimize the system performance.

To at least partially solve the above and other potential drawbacks and problems in existing schemes, embodiments of the present disclosure propose that the network device configures a plurality of sets of power control parameters for the terminal device, and the terminal device selects one of the plurality of sets for uplink transmit power control based on a beam pattern used by the terminal device. Thereby, the system performance is optimized by considering the beam pattern used by the terminal device in the power control.

Figure 2:
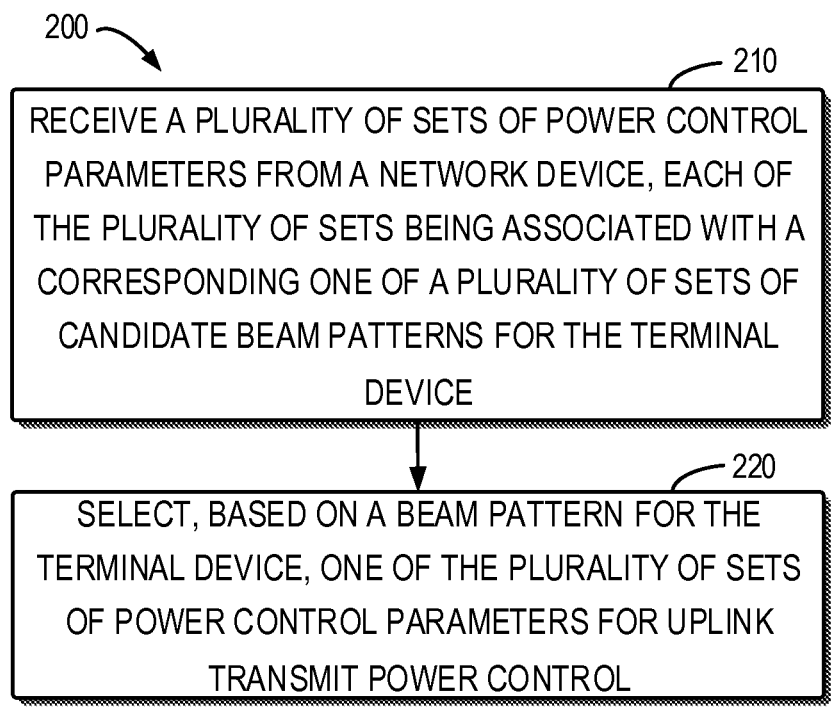
FIG. 2 shows a flowchart of a method implemented at a terminal device according to some embodiments of the present disclosure.

With reference to FIGS. 2 to 5, detailed description is presented below to the embodiments of the present disclosure. FIG. 2 shows a flowchart of a communication method 200 implemented at a terminal device according to some embodiments of the present disclosure. In some embodiments, the method 200 may be implemented, for example, by any one of the terminal device $120_1$ and the terminal device $120_2$. The scope of the embodiments of the present disclosure is not limited in this regard. For the discussion purpose, the method 200 will be illustrated by using the terminal device $120_1$ as an example. However, it should be understood the terminal device $120_2$ and other terminal device may communicate like the terminal device $120_1$.

At 210, the terminal device $120_1$ receives a plurality of sets of power control parameters from the network device 110. Each of the plurality of sets of power control parameters is associated with a corresponding one of a plurality of sets of candidate beam patterns.

Specifically, because the terminal device $120_1$ is within the coverage of the network device 110, the network device 110 has capability information of the terminal device $120_1$. The capability information of the terminal device $120_1$ may include, for example, the number of beams (i.e., the number of antennas) of the terminal device $120_1$. Therefore, in some embodiments, the network device 110 may determine a plurality of sets of candidate beam patterns used for the terminal device based on the number of the beams of the terminal device.

In some embodiments, each of the plurality of sets of candidate beam patterns may include one candidate beam pattern. Thereby, each of power control parameters may be associated with one candidate beam pattern in the corresponding one of the candidate bean patterns. In other embodiments, each of the plurality of sets of candidate beam patterns may include a plurality of candidate beam patterns. Thereby, each of power control parameters may be associated with a plurality of candidate beam patterns in the corresponding one of candidate bean patterns.

In some embodiments, the candidate beam pattern may indicate a beam width used by the terminal device, e.g., the main lobe width of the beams. For example, the candidate beam pattern for the terminal device $120_1$ may indicate a beam width of 30 degree, 60 degree or 90 degree, and the candidate beam pattern for the terminal device $120_2$ may indicate a beam width of 45 degree, 75 degree or 115 degree.

In the embodiment where each of candidate beam patterns includes a plurality of candidate beam patterns, the set of candidate beam patterns may indicate a predetermined range of the beam width. For example, a first set of candidate beam patterns may indicate a range of the beam width between 30 degree and 60 degree, a second set of candidate beam patterns may indicate a range of the beam width between 60 degree and 120 degree, and a third set of candidate beam patterns may indicate a range of the beam width between 120 degree and 180 degree.

It should be understood that the number of sets of candidate beam patterns, the beam width as well as the range of the beam width described herein are merely for the illustration purpose and not limiting. The terminal device may has any appropriate beam width, and the network device 110 may determine any appropriate number of sets of candidate beam patterns and any appropriate range of the beam width based on the capability information of the terminal device.

In some embodiments, the terminal device $120_1$ may receive a plurality of sets of power control parameters from the network device 110 by receiving therefrom a signaling that includes the plurality of sets of power control parameters. In some embodiments, the signaling may include existing signaling. In other embodiments, the signaling may include newly-defined dedicated signaling used for transferring the plurality of sets of power control parameters.

In some embodiments, the method 200 further comprises receiving from the network device 110 a rule regarding the association between each of the plurality of sets of power control parameters and a corresponding one of the plurality of sets of candidate beam patterns of the terminal device. That is, the rule indicates how each of the plurality of sets of power control parameters is associated with a corresponding one of the plurality of sets of candidate beam patterns of the terminal device.

It may be understood that in the embodiment where the plurality of sets of candidate beam patterns for the terminal device are determined based on the beam number of the terminal device, the number of the sets of power control parameters will increase with the increasing of the beam number of the terminal device. Thereby, the signaling overhead for transferring the sets of power control parameters to the terminal device will increase with the increasing of the beam number of the terminal device. To reduce the signaling overhead, in some embodiments, the network device may configure only a first set and a second set of power control parameters for the terminal device. Accordingly, the terminal device receives the first set and the second set of power control parameters from the network device.

In some embodiments, the first set of power control parameters is associated with a directional beam pattern, and the second set of power control parameters is associated with an omni beam pattern. For example, in the embodiment where the beam pattern indicates the beam width of the terminal device, the directional beam pattern may indicate the beam width of the terminal device is any value other than 360 degree, and the omni beam pattern may indicate the beam width of the terminal device is 360 degree.

In other embodiments, the first set of power control parameters is associated with a first set of candidate beam patterns, the second set of power control parameters is associated with a second set of candidate beam patterns, the first set of candidate beam patterns indicates the beam width is above a predetermined beam width (e.g., 180 degree), and the second set of candidate beam patterns indicates the beam width is below a predetermined beam width (e.g., 180 degree).

In some embodiments, each of the sets of power control parameters may include a first reference power $P_0$ of the network device 110 and a compensation factor $\alpha$ for the path loss between the network device 110 and the terminal device $120_1$. The first reference power $P_0$ may include a second reference power for the network device 110 and an offset for the terminal device $120_1$. The combination of the first reference power $P_0$ and the compensation factor $\alpha$ allows the network device 110 to configure the degree to which the terminal device responds to the path loss.

Specifically, the compensation factor $\alpha$ may adjust the power control between "no path-loss compensation" and "full path-loss compensation." In some embodiments, the compensation factor $\alpha$ may be set to be 1. Thereby, the path loss will be fully compensated at the terminal device $120_1$, and the user in the cell will get the fairness treatment, but the interference of the user in the cell to other cells will be large.

In further embodiments, the compensation factor $\alpha$ may be set to be any value within the range between 0 and 1. Thereby, the path loss will be partially compensated at the terminal device $120_1$. With the partial path loss compensation, the received PSD for a given modulation coding scheme is reduced as the path loss increases. Further, where the terminal device $120_1$ is at the edge of the cell, the terminal device $120_1$ will cause less interference to neighboring cells. It is demonstrated that $\alpha$ around 0.7-0.8 will provide a close-to-maximal uplink system capacity (typically around 15-25% greater than that can be achieved with full path-loss compensation) without causing significant degradation to the cell-edge data rate.

Still with reference to FIG. 2, at 220, one set is selected from the plurality of sets of power control parameters for uplink transmit power control based on a beam pattern of the terminal device $120_1$. The beam pattern of the terminal device $120_1$ is included in one of the plurality of sets of candidate beam patterns associated with the selected one of the plurality of sets of power control parameters.

In the embodiment where each of the sets of power control parameters is associated with one candidate beam pattern, the terminal device $120_1$ may select, based on a beam pattern of the terminal device $120_1$, a set of power control parameters associated with the beam pattern. For example, the beam pattern of the terminal device $120_1$ may indicate the beam width of the terminal device $120_1$ is 30 degree, and one of the plurality of sets of power control parameters is associated with a candidate beam pattern that indicates the beam width of 30 degree. Thereby, the terminal device $120_1$ may select the set of power control parameters associated with the candidate beam pattern that indicates the beam width of 30 degree.

In the embodiment where each of the sets of power control parameters is associated with a plurality of candidate beam patterns and a corresponding one of candidate beam patterns indicates a predetermined range of the beam width of the terminal device, the terminal device $120_1$ may select, based on the beam pattern of the terminal device $120_1$, a set of power control parameters associated with a set of candidate beam patterns indicating the predetermined range of the beam width. For example, the beam pattern of the terminal device $120_1$ may indicate the beam width of the terminal device $120_1$ is 30 degree, and one of the plurality of sets of power control parameters is associated with a first set of candidate beam patterns that indicate a beam width range between 30 degree and 60 degree. Thereby, the terminal device $120_1$ may select the set of power control parameters associated with the first set of candidate beam patterns.

In the power control scheme according to the embodiments of the present disclosure, the network device configures a plurality of sets of power control parameters for the terminal device, the terminal device selects an appropriate one of the plurality of sets of power control parameters based on its own beam pattern, and the terminal device performs uplink transmission by means of the transmit power determined based on the selected set of power control parameters. This may optimize the tradeoff between the receive power and the interference to neighboring cells.

It may be understood that in the LTE systems, the terminal device adopting an omni antenna will generate greater interference to neighboring cells than the terminal device adopting a narrower beam for beamforming. Therefore, according to the embodiments of the present disclosure, if the terminal device adopts a narrower beam (assuming the narrower beam is aligned with the beam in the receiver of the network device), the terminal device may select a larger compensation factor $\alpha$ than the case of an omni antenna without increasing interference to neighboring cells.

The receiving and selecting of a set of power control parameters have been illustrated by way of example. After selecting the set of power control parameters, the terminal device may determine uplink transmit power by using the selected set of power control parameters. For example, in the embodiment where the set of power control parameters includes the first reference power $P_0$ and the compensation factor $\alpha$ for path loss, the terminal device may complete the open-loop uplink transmit power control by using the expression (2). Of course, this is merely exemplary and not limiting. The terminal device may use any approach to determine the uplink transmit power according to parameters included in the set of power control parameters.

As described with reference to FIG. 1, in the case where the network device 110 adopts the analog beamforming or hybrid analog and digital beamforming, the terminal device $120_1$ is at the edge of the beam of the network device 110 and thus the beamforming gain of the terminal device $120_1$ is smaller; the terminal device $120_2$ is at the center of the beam of the network device 110 and thus the beamforming gain of the terminal device $120_2$ is larger. Similarly, in the case where the terminal device (e.g., the terminal device $120_1$) adopts the analog beamforming or hybrid analog and digital beamforming, if the network device 110 is at the edge of the beam of the terminal device $120_1$, the beamforming gain of the network device 110 is smaller; and if the network device 110 is at the center of the beam of the terminal device $120_1$, the beamforming gain of the network device 110 is larger.

In other words, due to different positions of the terminal devices in the cell, the interference to neighboring cells will also be different. In addition, due to different positions of the terminal devices in the receiver beam of network device or different positions of the network device in the transmitter beams of the terminal devices, the interference caused by the terminal devices or the network device to neighboring cells may also differ. In view of the above, the embodiments of the present disclosure propose a scheme for separately compensating the pure path loss and the beamforming gain. A detailed description is presented below with reference to FIG. 3.

Figure 3:
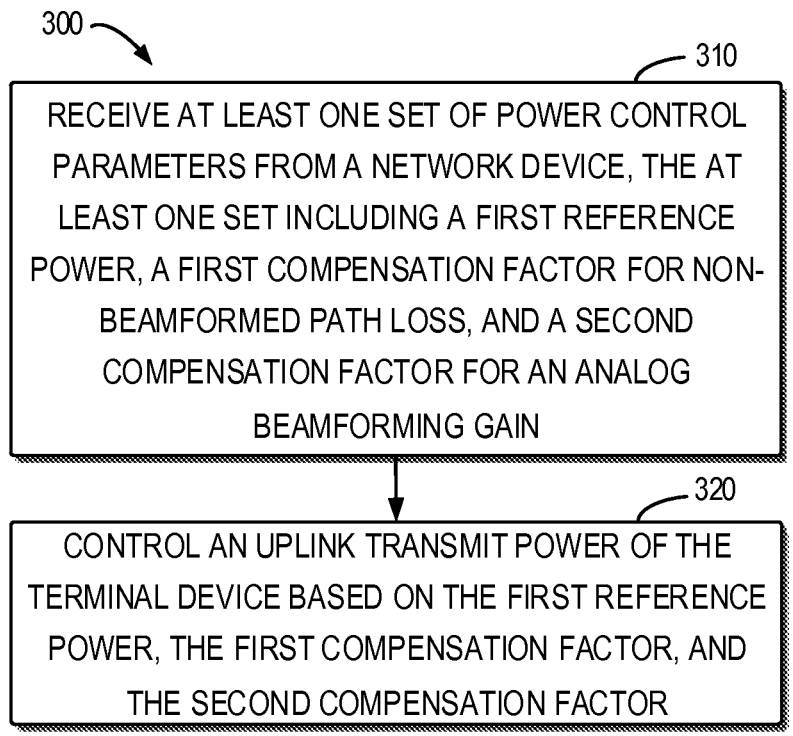
FIG. 3 shows a flowchart of a method implemented at a terminal device according to some embodiments of the present disclosure.

FIG. 3 shows a flowchart of a communication method 300 implemented at a terminal device according to some embodiments of the present disclosure. In some embodiments, the method 300 may be implemented, for example, by any one of the terminal device $120_1$ and the terminal device $120_2$. It should be understood that the method 300 may further comprise additional actions that are not shown and/or may omit actions that are shown. The scope of the embodiments of the present disclosure is not limited in this regard. For the discussion purpose, the method 300 will be illustrated by using the terminal device $120_1$ as an example. However, it should be understood that the terminal device $120_2$ and other terminal device may communicate like the terminal device $120_1$.

At 310, the terminal device $120_1$ receives at least one set of power control parameters from the network device 110. The at least one set includes at least a first reference power $P_0$, a first compensation factor $\alpha1$ for the non-beamformed path loss between the terminal device $120_1$ and the network device 110, and a second compensation factor $\alpha2$ for an analog beamforming gain A for at least one of the terminal device $120_1$ and the network device 110. The analog beamforming gain A results from a beamforming operation. The first reference power includes a second reference power for the network device and an offset for the terminal device.

At 320, the terminal device $120_1$ controls uplink transmit power of the terminal device $120_1$ based on the first reference power $P_0$, the first compensation factor $\alpha1$ and the second compensation factor $\alpha2$. For example, in some embodiments, the first compensation factor $\alpha1$ may be same as the second compensation factor $\alpha2$. In other embodiments, the first compensation factor $\alpha1$ may be different from the second compensation factor $\alpha2$.

To separately compensate the pure path loss and the beamforming gain, in some embodiments, the terminal device $120_1$ may receive a reference signal from the network device 110 to determine a first estimation PL of the non-beamformed path loss. In addition, the terminal device 1201 may further receive a beamformed reference signal from the network device 110 to determine a second estimation $PL_{BF}$ of the beamformed path loss. Subsequently, the terminal device $120_1$ may determine the analog beamforming gain A based on a difference between the first estimation PL and the second estimation $PL_{BF}$.

After determining the first estimation PL of the non-beamformed path loss and the analog beamforming gain A, the terminal device 120 may determine an uplink transmit power spectrum density P based on an expression as following:

$$P = P_0 + \alpha1 \cdot PL - \alpha2 \cdot A \quad (4)$$

where P denotes an uplink transmit power spectrum density of the terminal device, $P_0$ denotes the first reference power, PL denotes the first estimation of the non-beamformed path loss, A denotes the analog beamforming gain, $\alpha1$ denotes the first compensation factor, and $\alpha2$ denotes the second compensation factor.

With the scheme for separately compensating the pure path loss and the beamforming gain according to the embodiments of the present disclosure, the receiving power and the interference to neighboring cells may be considered optimally. In particular, the expression (4) may be converted as following:

$$\begin{aligned} P &= P_0 + \alpha1 \cdot PL - \alpha2 \cdot A \quad (5) \\ &= P_0 + (\alpha1 - \alpha2) \cdot PL + \alpha2 \cdot PL - \alpha2 \cdot A \\ &= P_0 + (\alpha1 - \alpha2) \cdot PL + \alpha2 \cdot (PL - A) \end{aligned}$$

As seen from the expression (5), if the terminal device $120_1$ and the terminal device $120_2$ have the same beamformed path loss (i.e., PL−A), the first compensation factor $\alpha1$ may be different from the second compensation factor $\alpha2$ so that the transmit power of the terminal device $120_1$ and the terminal device $120_2$ will be different. Thus, the receiving power and the interference to neighboring cells may be considered optimally. For example, the interference of the cell-edge terminal device $120_2$ to neighboring cells may be reduced.

In addition, if the network device simultaneously uses a plurality of beams to cover the whole cell, the overlapped beam might occur. Therefore, in the case where a user at the center of a beam of the network device and a user at the edge of the beam have the same pure path loss, the user at the edge of the beam will generate larger interference to a neighboring beam than the user at the center of the beam. By means of the embodiments according to the present disclosure, the interference to the neighboring cell may be reduced by separately compensating the pure path loss and the beamforming gain.

Moreover, in the expression (4), if the second compensation factor α2 is set to be 0, it means the analog beamforming gain will not be considered in the transmit power control and only the pure path loss is taken into consideration. Thus, the expression (4) may be simplified as following:

$$P = P_0 + \alpha 1 \cdot PL \tag{6}$$

In some embodiments, the expression (6) may be applicable to scenarios of the dynamic analog beamforming. Since the analog beamforming gain can be considered together with the digital domain processing in the dynamic scheduler, the fairness among different terminal devices can be guaranteed through the dynamic analog beamforming for different terminal devices in different time intervals.

In addition, for the dynamic analog beamforming, since the dynamic analog beamforming usually spends 100 ms to 500 ms in estimating one stable path loss (in LTE systems) and the beamforming changes dynamically, it is hard to measure the path loss by using the reference signal with dynamic analog beamforming. Therefore, the expression (6) is more suitable for the uplink power control in scenarios of dynamic analog beamforming.

In some embodiments, in order to simultaneously support the static or semi-static and dynamic analog beamforming, the network device can configure a first set of power control parameters and a second set of power control parameters such that the first set comprises the first reference power $P_0$, the first compensation factor α1 and the second compensation factor α2 (α2 is not equal to 0) and the second set comprises the first reference power $P_0$, the first compensation factor α1 and the second compensation factor α2 (α2 is equal to 0). Thereby, the terminal device may select one of the first set and the second set for the uplink power control based on its own beamforming pattern.

Based on the open-loop power control scheme according to the embodiments of the present disclosure, a coarse operating point may be set for the modulation coding scheme so as to set the transmission power spectrum density. Hence, the closed-loop power control can fast adjust the power around the operating point to fine-tune the power setting to adapt the channel condition as well as the interference level.

It should be understood that in some embodiments, the methods 200 and 300 described above may be used in combination. In such embodiments, the plurality of sets of power control parameters received by the terminal device from the network device may each include the first reference power $P_0$, the first compensation factor α1 for the non-beamformed path loss between the terminal device and the network device, and the second compensation factor α2 for an analog beamforming gain resulting from beamforming for at least one of the terminal device and the network device. The first reference power $P_0$ may include a second reference power for the network device and an offset for the terminal device.

To separately compensate the pure path loss and the beamforming gain, in some embodiments, the terminal device may receive a reference signal from the network device to determine a first estimation PL of the non-beamformed path loss. In addition, the terminal device may further receive a beamformed reference signal from the network device to determine a second estimation $PL_{BF}$ of the beamformed path loss. Subsequently, the terminal device may determine the anlog beamforming gain A based on a difference between the first estimation PL and the second estimation $PL_{BF}$.

After determining the first estimation PL of the non-beamformer path loss and the analog beamforming gain A, the terminal device may determine uplink transmit power P based on the expression (4) as described above.

The communication method implemented at the terminal device has been described with reference to FIGS. 2 and 3. Description is presented below to a communication method implemented at a network device with reference to FIGS. 4 and 5.

Figure 4:
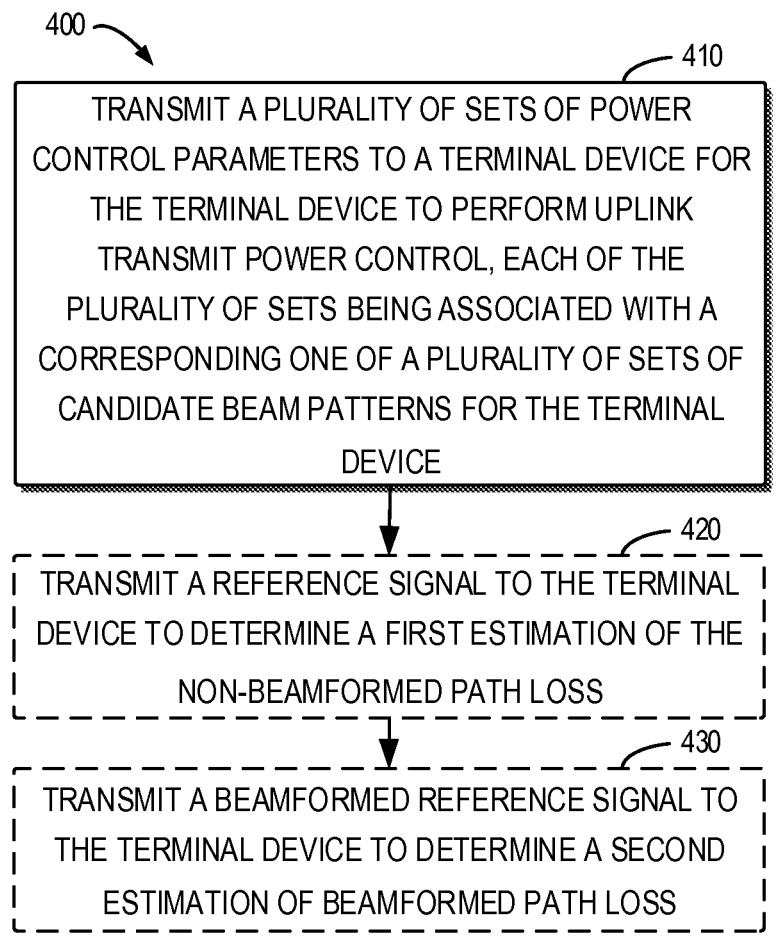
FIG. 4 shows a flowchart of a method implemented at a network device according to some embodiments of the present disclosure.

FIG. 4 shows a flowchart of a method 400 implemented at a network device according to some embodiments of the present disclosure. In some embodiments, the method 400 may be implemented by the network device 110 for example. It should be understood that the method 400 may further comprise additional actions that are not shown and/or may omit actions that are shown. The scope of the embodiments of the present disclosure is not limited in this regard.

As shown, at 410, the network device 110 transmits a plurality of sets of power control parameters to a terminal device for the terminal device to perform uplink transmit power control. Each of the plurality of sets of power control parameters is associated with a corresponding one of plurality of sets of candidate beam patterns for the terminal device.

In some embodiments, transmitting the plurality of sets of power control parameters to the terminal device comprises transmitting to the terminal device a signaling that includes the plurality of sets of power control parameters.

In some embodiments, the signaling includes a dedicated signaling used for transferring the plurality of sets.

In some embodiments, the method 400 further comprises transmitting to the terminal device a rule regarding the association between each of the plurality of sets of power control parameters and a corresponding one of the plurality of sets of candidate beam patterns for the terminal device.

In some embodiments, each of the plurality of sets of candidate beam patterns includes one candidate beam pattern of the terminal device, and each of the plurality of sets of power control parameters is associated with the one candidate beam pattern in the corresponding one of the plurality of sets of candidate beam patterns.

In some embodiments, each of the plurality of sets of candidate beam patterns includes a plurality of candidate beam patterns of the terminal device, and each of the plurality of sets of power control parameters is associated with the plurality of candidate beam patterns in the corresponding one of the plurality of sets of candidate beam patterns.

In some embodiments, the corresponding one of candidate beam patterns indicates a predetermined range of a beam width.

In some embodiments, each of the plurality of sets of power control parameters includes a first reference power including a second reference power for the network device and an offset for the terminal device; and a compensation factor for path loss between the terminal device and the network device.

In some embodiments, each of the plurality of sets of power control parameters includes a first reference power including a second reference power for the network device and an offset for the terminal device; a first compensation factor for non-beamformed path loss between the terminal device and the network device; and a second compensation factor for an analog beamforming gain resulting from beamforming for at least one of the terminal device and the network device, the second compensation factor being different from the first compensation factor.

Optionally, in some embodiments, the method 400 may further comprise at 420, transmitting a reference signal to the terminal device to determine a first estimation of the non-beamformed path loss; and transmitting a beamformed reference signal to the terminal device to determine a second estimation of beamformed path loss. The procedure of determining the plurality of sets of power control parameters and the plurality of sets of candidate beam patterns is similar to the procedure described with reference to FIG. 2 and the details of the procedure is not described.

Figure 5:
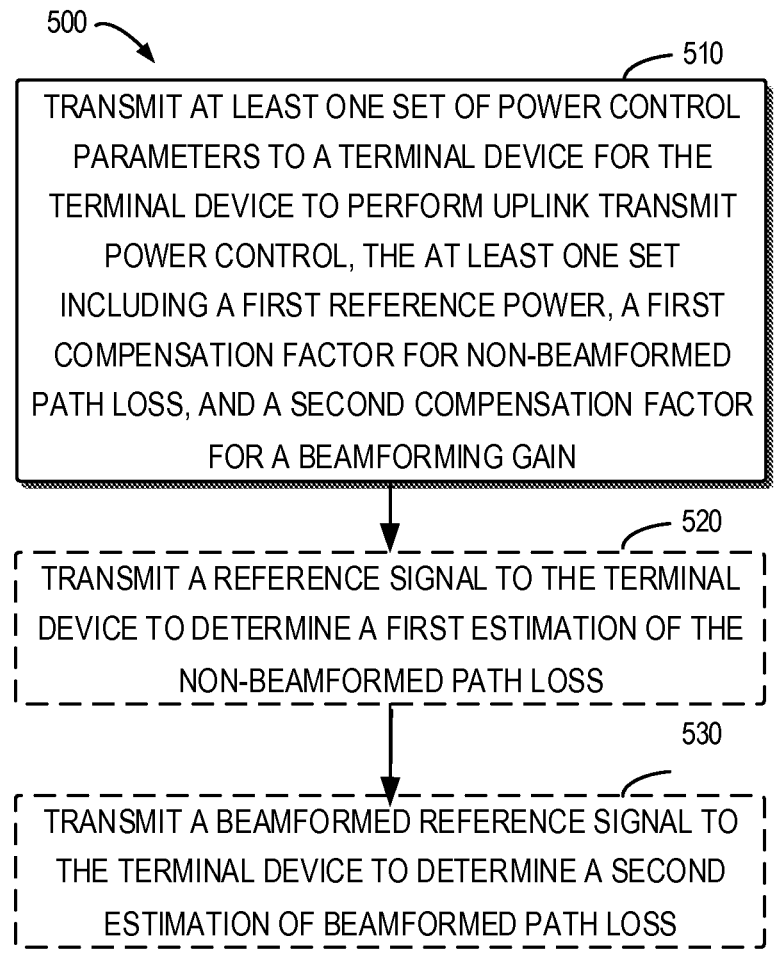
FIG. 5 shows a flowchart of a method implemented at a network device according to some embodiments of the present disclosure.

FIG. 5 shows a flowchart of a method 500 implemented at a network device according to some embodiments of the present disclosure. In some embodiments, the method 500 may be implemented by the network device 110 for example. It should be understood the method 500 may further comprise additional actions that are not shown and/or may omit actions that are shown. The scope of the embodiments of the present disclosure is not limited in this regard.

As shown, at 510, the network device 110 transmits at least one set of power control parameters to a terminal device for the terminal device to perform uplink transmit power control. The at least one set comprises a first reference power, a first compensation factor for non-beamformed path loss between the terminal device and the network device, and a second compensation factor for an analog beamforming gain resulting from beamforming for at least one of the terminal device and the network device. The first reference power comprises a second reference power for the network device and an offset for the terminal device.

Optionally, in some embodiments, the method 500 may further comprise at 520, transmitting a reference signal to the terminal device to determine a first estimation of the non-beamformed path loss; and transmitting a beamformed reference signal to the terminal device to determine a second estimation of beamformed path loss.

It should be understood that similar to the methods 200 and 300, in some embodiments, the methods 400 and 500 may also be used in combination. In such embodiments, each of the plurality of sets of power control parameters transmitted by the network device to the terminal device includes the first reference power $P_0$, the first compensation factor $\alpha 1$ for the non-beamformed path loss between the terminal device and the network device, and the second compensation factor $\alpha 2$ for an analog beamforming gain resulting from beamforming for at least one of the terminal device and the network device. The first reference power $P_0$ may include a second reference power for the network device and an offset for the terminal device.

To cause the terminal device to separately compensate the pure path loss and the beamforming gain, in some embodiments, the network device may transmit a reference signal to the terminal device to determine a first estimation PL of the non-beamformed path loss. In addition, the network device may further transmit a beamformed reference signal to the terminal device to determine a second estimation $PL_{BF}$ of beamformed path loss.

The communication methods according to the embodiments of the present disclosure have been described in detail with reference to FIGS. 2 to 5. Now description is presented below to apparatuses according to the embodiments of the present disclosure with reference to FIGS. 6 to 9.

Figure 6:
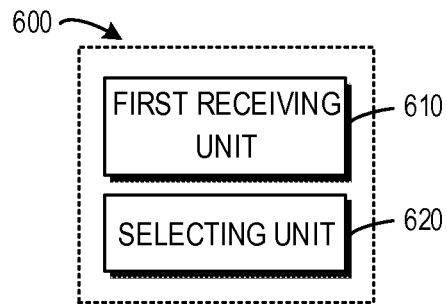
FIG. 6 shows a block diagram of an apparatus implemented at a terminal device according to some embodiments of the present disclosure.

FIG. 6 shows a block diagram of an apparatus 600 according to some embodiments of the present disclosure. It may be understood the apparatus 600 may be implemented at any of the terminal device 120₁ side and the terminal device 120₂ side as shown in FIG. 1. As shown in FIG. 6, the apparatus 600 comprises a first receiving unit 610 configured to receive a plurality of sets of power control parameters from a network device, each of the plurality of sets being associated with a corresponding one of a plurality of sets of candidate beam patterns of a terminal device; and a selecting unit 620 configured to select, based on a beam pattern for the terminal device, one set from the plurality of sets of power control parameters for uplink transmit power control. The beam pattern for the terminal device is included in a set of candidate beam patterns associated with the selected set of power control parameters.

In some embodiments, the first receiving unit 610 is further configured to receive from the network device a signaling that includes the plurality of sets.

In some embodiments, the signaling includes a dedicated signaling used for transferring the plurality of sets of power control parameters.

In some embodiments, the first receiving unit 610 is further configured to receive from the network device a rule regarding the association between each of the plurality of sets of power control parameters and a corresponding one of the plurality of sets of candidate beam patterns of the terminal device.

In some embodiments, each of the plurality of sets of candidate beam patterns includes one candidate beam pattern of the terminal device, and each of the plurality of sets of power control parameters is associated with the one candidate beam pattern in the corresponding one of the plurality of sets of candidate beam patterns.

In some embodiments, each of the plurality of sets of candidate beam patterns includes a plurality of candidate beam patterns of the terminal device, and each of the plurality of sets of power control parameters is associated with the plurality of candidate beam patterns in the corresponding one of the plurality of sets of candidate beam patterns.

In some embodiments, the corresponding one of the sets of candidate beam patterns indicates a predetermined range of the beam width.

In some embodiments, each of the plurality of sets of power control parameters includes a first reference power including a second reference power for the network device and an offset for the terminal device; and a compensation factor for path loss between the terminal device and the network device.

In some embodiments, each of the plurality of sets of power control parameters includes a first reference power including a second reference power for the network device and an offset for the terminal device; a first compensation factor for non-beamformed path loss between the terminal device and the network device; and a second compensation factor for an analog beamforming gain resulting from beamforming for at least one of the terminal device and the network device, the second compensation factor being different from the first compensation factor.

In some embodiments, the selecting unit 620 is further configured to determine a first estimation of the non-beamformed path loss based on a reference signal received from the network device; determine a second estimation of beamformed path loss based on the beamformed reference signal received from the network device; and determine the beamforming gain based on a difference between the first estimation and the second estimation.

In some embodiments, the selecting unit 620 is further configured to determine a uplink transmit power of the terminal device based on an expression as following:

$$P = P_0 + \alpha_1 \cdot PL - \alpha_2 \cdot A$$

where P denotes the uplink transmit power of the terminal device, $P_0$ denotes the first reference power, PL denotes the first estimation of the non-beamformed path loss, A denotes the beamforming gain, $\alpha_1$ denotes the first compensation factor, and $\alpha_2$ denotes the second compensation factor.

Figure 7:
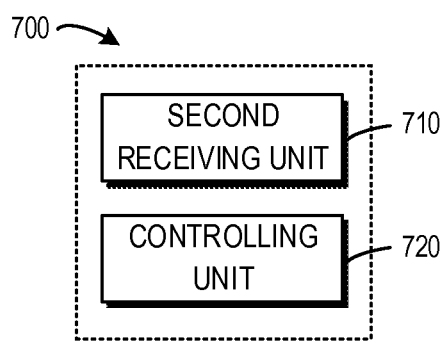
FIG. 7 shows a block diagram of an apparatus implemented at a terminal device according to some embodiments of the present disclosure.

FIG. 7 shows a block diagram of an apparatus 700 according to some embodiments of the present disclosure. It may be understood that the apparatus 700 may be implemented at any of the terminal device $120_1$ side and the terminal device $120_2$ side as shown in FIG. 1. As shown in FIG. 7, the apparatus 700 comprises: a second receiving unit 710 configured to receive at least one set of power control parameters from a network device, the at least one set comprising a first reference power, a first compensation factor for non-beamformed path loss between a terminal device and the network device, and a second compensation factor for an analog beamforming gain resulting from beamforming for at least one of the terminal device and the network device, the first compensation factor being different from the second compensation factor, the first reference power comprising a second reference power for the network device and an offset for the terminal device; and a control unit 720 configured to control uplink transmit power of the terminal device based on the first reference power, the first compensation factor and the second compensation factor.

In some embodiments, the control unit 720 is further configured to determine a first estimation of the non-beamformed path loss based on a reference signal received from the network device; determine a second estimation of beamformed path loss based on the beamformed reference signal received from the network device; and determine the beamforming gain based on a difference between the first estimation and the second estimation.

In some embodiments, the control unit 720 is further configured to determine uplink transmit power of the terminal device based on an expression as following:

$$P = P_0 + \alpha_1 \cdot PL - \alpha_2 \cdot A$$

where P denotes the uplink transmit power of the terminal device, $P_0$ denotes the first reference power, PL denotes the first estimation of the non-beamformed path loss, A denotes the beamforming gain, $\alpha_1$ denotes the first compensation factor, and $\alpha_2$ denotes the second compensation factor.

Figure 8:
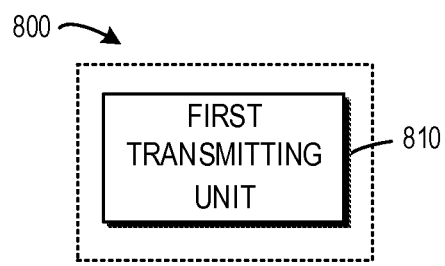
FIG. 8 shows a block diagram of an apparatus implemented at a network device according to some embodiments of the present disclosure.

FIG. 8 shows a block diagram of an apparatus 800 according to some embodiments of the present disclosure. It may be understood that the apparatus 800 may be implemented at the network device 110 side as shown in FIG. 1. As shown in FIG. 8, the apparatus 800 comprises: a first transmitting unit 810 configured to transmit a plurality of sets of power control parameters to a terminal device for the terminal device to perform uplink transmit power control, each of the plurality of sets of power control parameters being associated with a corresponding one of a plurality of sets of candidate beam patterns of the terminal device.

In some embodiments, the first transmitting unit 810 is further configured to transmit to the terminal device signaling that includes the plurality of sets of power control parameters.

In some embodiments, the signaling includes a dedicated signaling used for transferring the plurality of sets of power control parameters.

In some embodiments, the first transmitting unit 810 is further configured to transmit to the terminal device a rule regarding the association between each of the plurality of sets of power control parameters and a corresponding one of a plurality of sets of candidate beam patterns of the terminal device.

In some embodiments, each of the plurality of sets of candidate beam patterns includes one candidate beam pattern of the terminal device, and each of the plurality of sets of power control parameters is associated with the one candidate beam pattern in the corresponding one of the plurality of sets of candidate beam patterns.

In some embodiments, each of the plurality of sets of candidate beam patterns includes a plurality of candidate beam patterns of the terminal device, and each of the plurality of sets of power control parameters is associated with the plurality of candidate beam patterns in the corresponding one of the plurality of sets of candidate beam patterns.

In some embodiments, the corresponding one of the plurality of sets of candidate beam patterns indicates a predetermined range of the beam width.

In some embodiments, each of the plurality of sets of power control parameters includes a first reference power including a second reference power for the network device and an offset for the terminal device; and a compensation factor for path loss between the terminal device and the network device.

In some embodiments, each of the plurality of sets of power control parameters includes a first reference power including a second reference power for the network device and an offset for the terminal device; a first compensation factor for non-beamformed path loss between the terminal device and the network device; and a second compensation factor for an analog beamforming gain resulting from beamforming for at least one of the terminal device and the network device, the second compensation factor being different from the first compensation factor.

In some embodiments, the first transmitting unit 810 is further configured to transmit a reference signal to the terminal device to determine a first estimation of the non-beamformed path loss; and transmit the beamformed reference signal to the terminal device to determine a second estimation of beamformed path loss.

Figure 9:
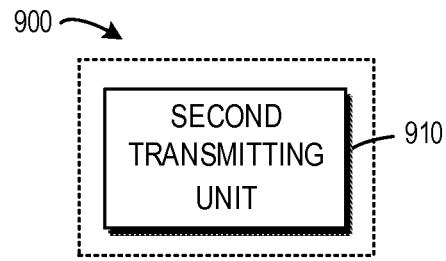
FIG. 9 shows a block diagram of an apparatus implemented at a network device according to some embodiments of the present disclosure.

FIG. 9 shows a block diagram of an apparatus 900 according to some embodiments of the present disclosure. It may be understood that the apparatus 900 may be implemented at the network device 110 side as shown in FIG. 1. As shown in FIG. 9, the apparatus 900 comprises: a second transmitting unit 910 configured to transmit at least one set of power control parameters to a terminal device for the terminal device to perform uplink transmit power control. The at least one set comprises a first reference power, a first compensation factor for non-beamformed path loss between the terminal device and the network device; and a second compensation factor for an analog beamforming gain resulting from beamforming for at least one of the terminal device and the network device, the first reference power comprising a second reference power for the network device and an offset for the terminal device.

In some embodiments, the second transmitting unit 910 is further configured to transmit a reference signal to the terminal device to determine a first estimation of the non-beamformed path loss; and transmit the beamformed reference signal to the terminal device to determine a second estimation of beamformed path loss.

It should be understood that each unit of the apparatuses 600 to 900 corresponds to each action of the methods 200 to 500 described with reference to FIGS. 2 to 5. Therefore, operations and features described above with reference to FIGS. 2 to 5 are also applicable to the apparatuses 600 to 900 as well as units included therein and have the same effect, details of which are ignored here.

The units included in the apparatuses 600 to 900 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses 600 to 900 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The units shown in FIG. 6 to 9 may be implemented, partially or entirely, as hardware modules, software modules, firmware modules or any combination thereof. In particular, in some embodiments, the flows, methods or processes described above may be implemented by hardware in a base station or terminal device. For example, the base station or terminal device may implement the methods 200 to 500 by means of its transmitter, receiver, transceiver and/or processor.

Figure 10:
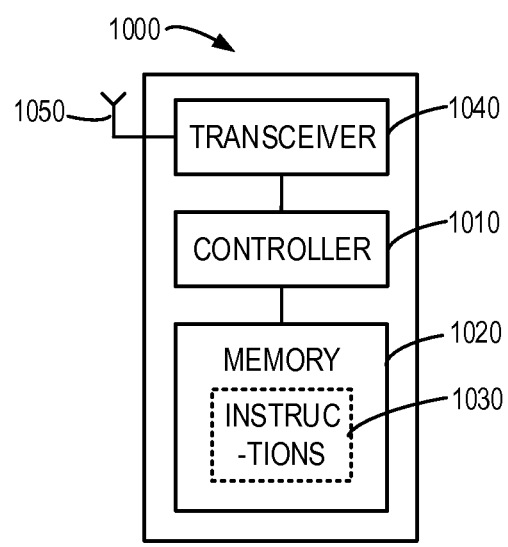
FIG. 10 shows a block diagram of a communication device which is applicable to implement some embodiments of the present disclosure.

FIG. 10 shows a block diagram of a device 1000 which is applicable to implement the embodiments of the present disclosure. The device 1000 may be used for implementing a network device such as the network device $120_1$ or $120_2$ as shown in FIG. 1.

As shown, the device 1000 comprises a controller 1010. The controller 1010 controls operations and functions of the device 1000. For example, in some embodiments, the controller 1010 may execute various operations by means of instructions 1030 stored in a memory 1020 coupled to the controller 1010. The memory 1020 may be of any appropriate type that is applicable to a local technical environment, and may be implemented using any appropriate data storage techniques, including without limitation to, semiconductor based memory devices, magnetic memory devices and systems, optical memory devices and systems. Though only one memory unit is shown in FIG. 10, there may be a plurality of physically different memory units in the device 1000.

The controller 1010 may be of any appropriate type that is applicable to a local technical environment, and may include without limitation to, a general-purpose computer, a special-purpose computer, a microprocessor, a digital signal processor (DSP), as well as one or more processors in a processor based multi-core processor architecture. The device 1000 may also comprise a plurality of controllers 1010. The controller 1010 is coupled to a transceiver 1040 that may enable information receiving and transmitting by means of one or more antennas 1050 and/or other component. Note in the context of the present disclosure, the transceiver 1040 may be a device capable of simultaneously performing data transmitting and receiving functions or may be a device only having a data transmitting or receiving function.

When the device 1000 acts as the network device 110, the controller 1010 and the transceiver 1040 may operate in cooperation to implement the methods 400 and 500 described with reference to FIGS. 4 and 5. When the device 1000 acts as the terminal device $120_1$ or $120_2$, the controller 1010 and the transceiver 1040 may operate in cooperation to implement the methods 200 and 300 described with reference to FIGS. 2 and 3. For example, all the above-described actions relating to data/information transmitting and receiving may be executed by the transceiver 1040, while other actions may be executed by the controller 1010. All features described with reference to FIGS. 1 to 5 are applicable to the device 1000, which is ignored here.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

For example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results.

In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in a plurality of embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

We claim:

1. A communication method implemented at a terminal device, comprising:
   receiving with the terminal device a plurality of sets of power control parameters from a network device, each of the plurality of sets being associated with a corresponding one of a plurality of sets of candidate beam patterns for the terminal device; and
   selecting with the terminal device, based on a beam pattern for the terminal device, one of the plurality of sets of power control parameters for uplink transmit power control, the beam pattern for the terminal device being included in the set of candidate beam pattern that is associated with the selected set of power control parameters.

2. The method according to claim 1, further comprising:
   receiving from the network device a rule regarding the association between each of the plurality of sets of power control parameters and the corresponding one of the plurality of sets of candidate beam patterns for the terminal device.

3. The method according to claim 1, wherein the plurality of sets of candidate beam patterns each include one candidate beam pattern for the terminal device, and each of the plurality of sets of power control parameters is associated with the one candidate beam pattern in the corresponding one of the plurality of sets of candidate beam patterns.

4. The method according to claim 1, wherein the plurality of sets of candidate beam patterns each include a plurality of candidate beam patterns for the terminal device, and each of the plurality of sets of power control parameters is associated with the plurality of candidate beam patterns in the corresponding one of the plurality of sets of candidate beam patterns.

5. The method according to claim 1, wherein the corresponding set of candidate beam patterns indicates a predetermined range of a beam width.

6. A terminal device, comprising:
   a transceiver configured to receive a plurality of sets of power control parameters from a network device, each of the plurality of sets being associated with a corresponding one of a plurality of sets of candidate beam patterns for the terminal device; and
   a controller configured to select, based on a beam pattern for the terminal device, one of the plurality of sets of power control parameters for uplink transmit power control, the beam pattern of the terminal device being included in the set of candidate beam patterns that is associated with the selected set of power control parameters.

* * * * *